June 30, 1964
A. W. ANDERSON
3,138,906
COMPRESSING MECHANISM FOR FOOD TRAYS
Filed Oct. 5, 1961
10 Sheets-Sheet 1
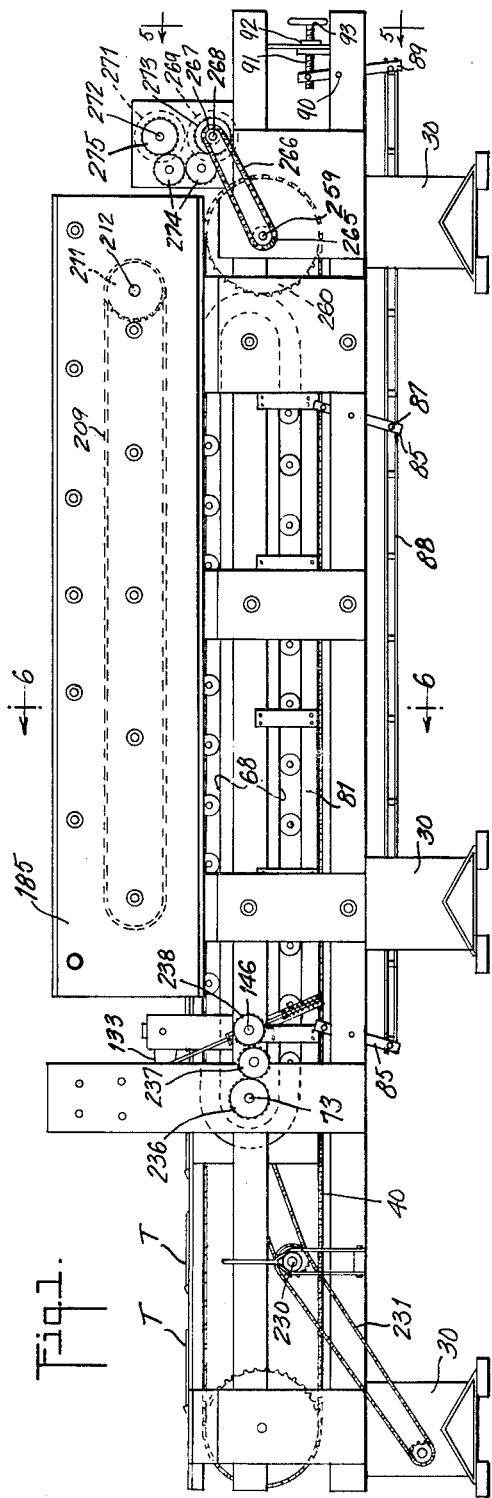
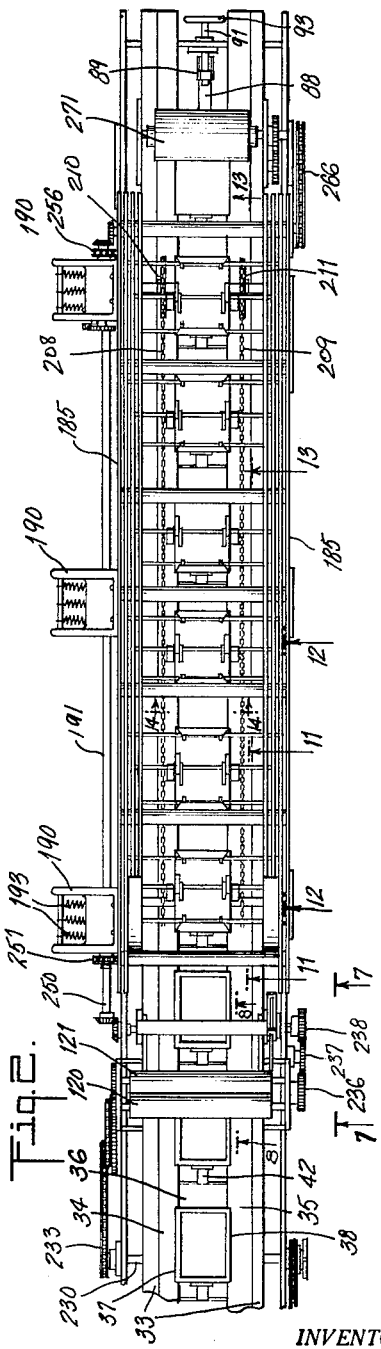
INVENTOR.
ANDREW W. ANDERSON
BY
ATTORNEY June 30, 1964  A. W. ANDERSON  3,138,906
COMPRESSING MECHANISM FOR FOOD TRAYS
Filed Oct. 5, 1961  10 Sheets-Sheet 2
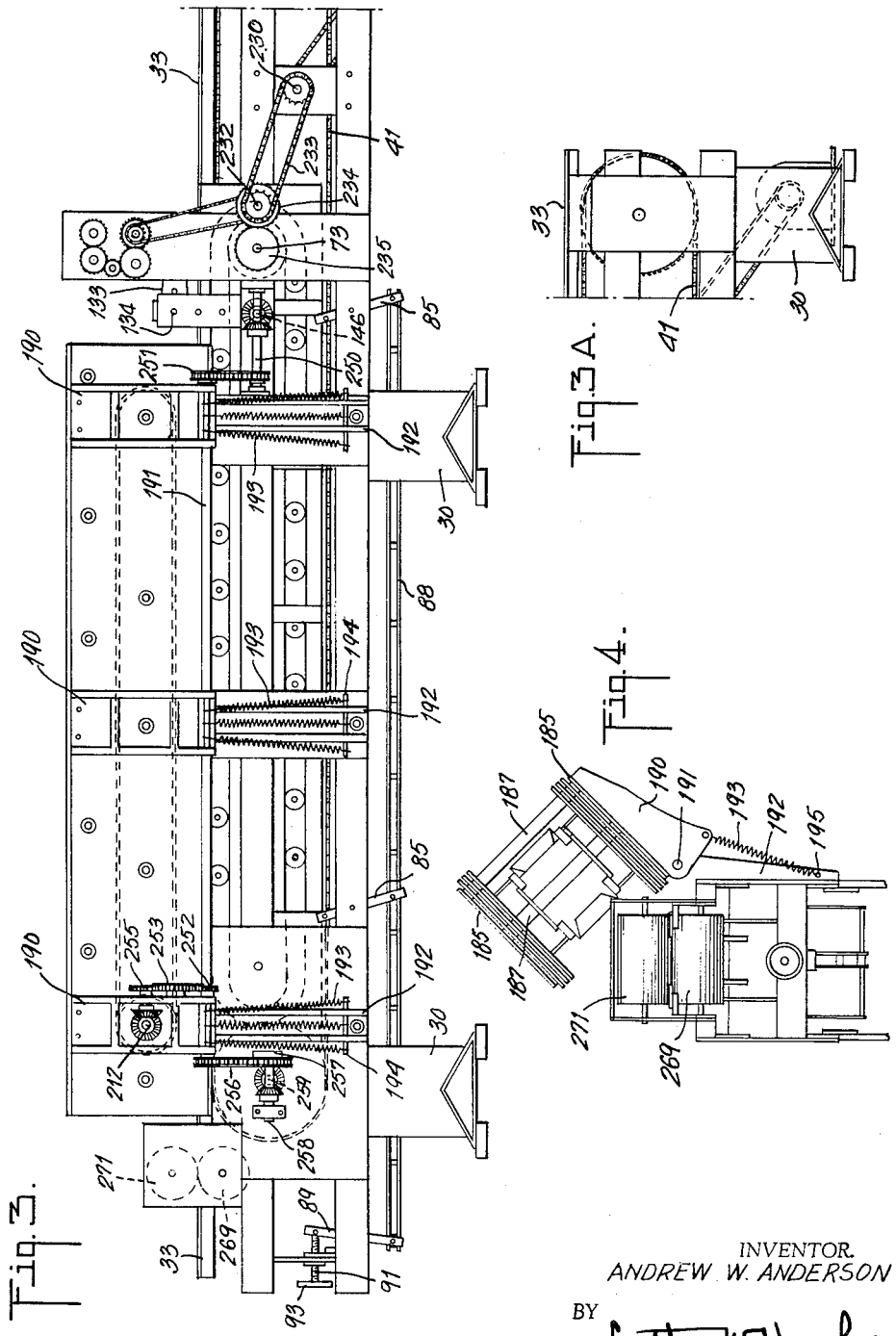
INVENTOR.
ANDREW W. ANDERSON
BY
Luther W Hawley
ATTORNEY

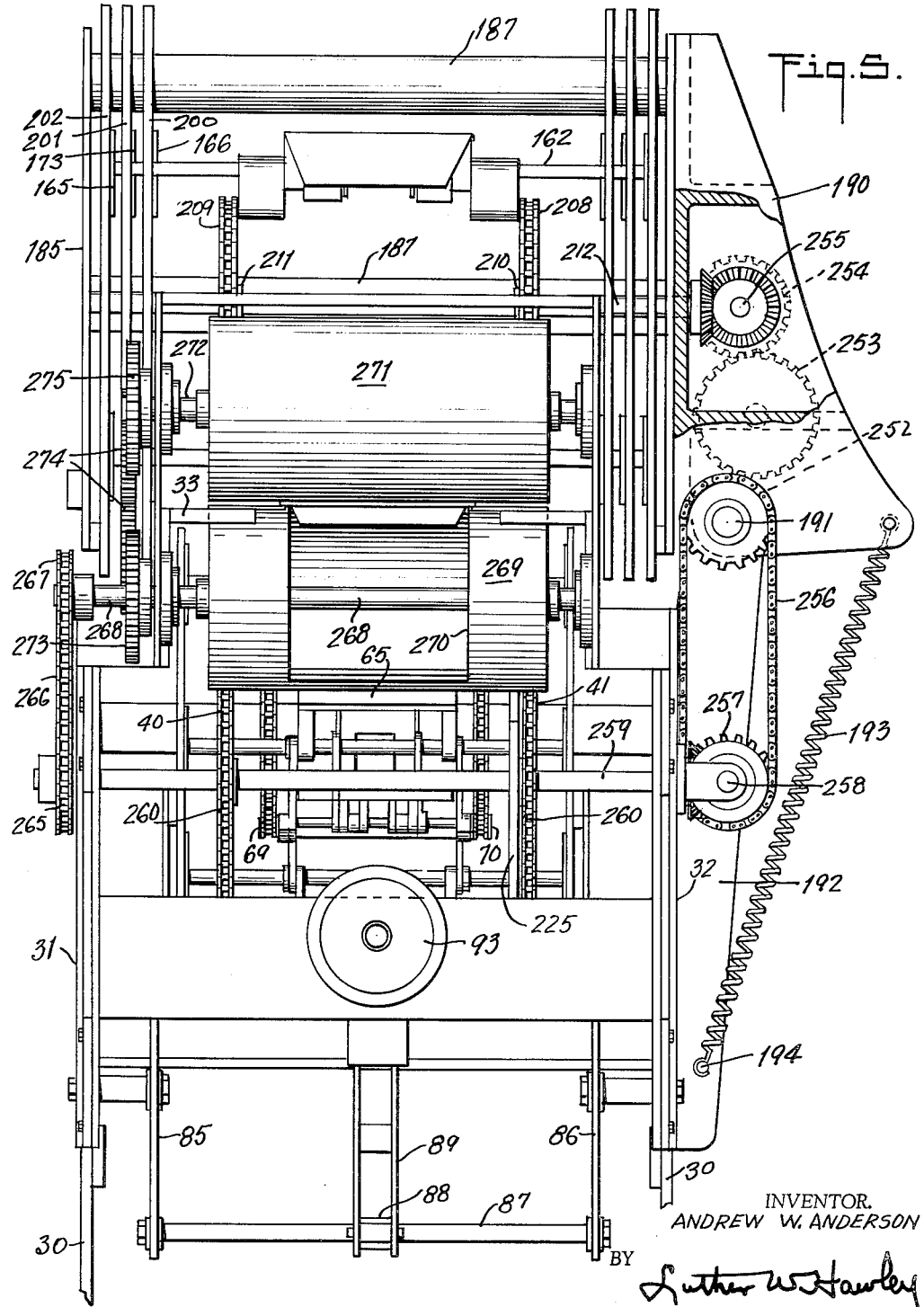

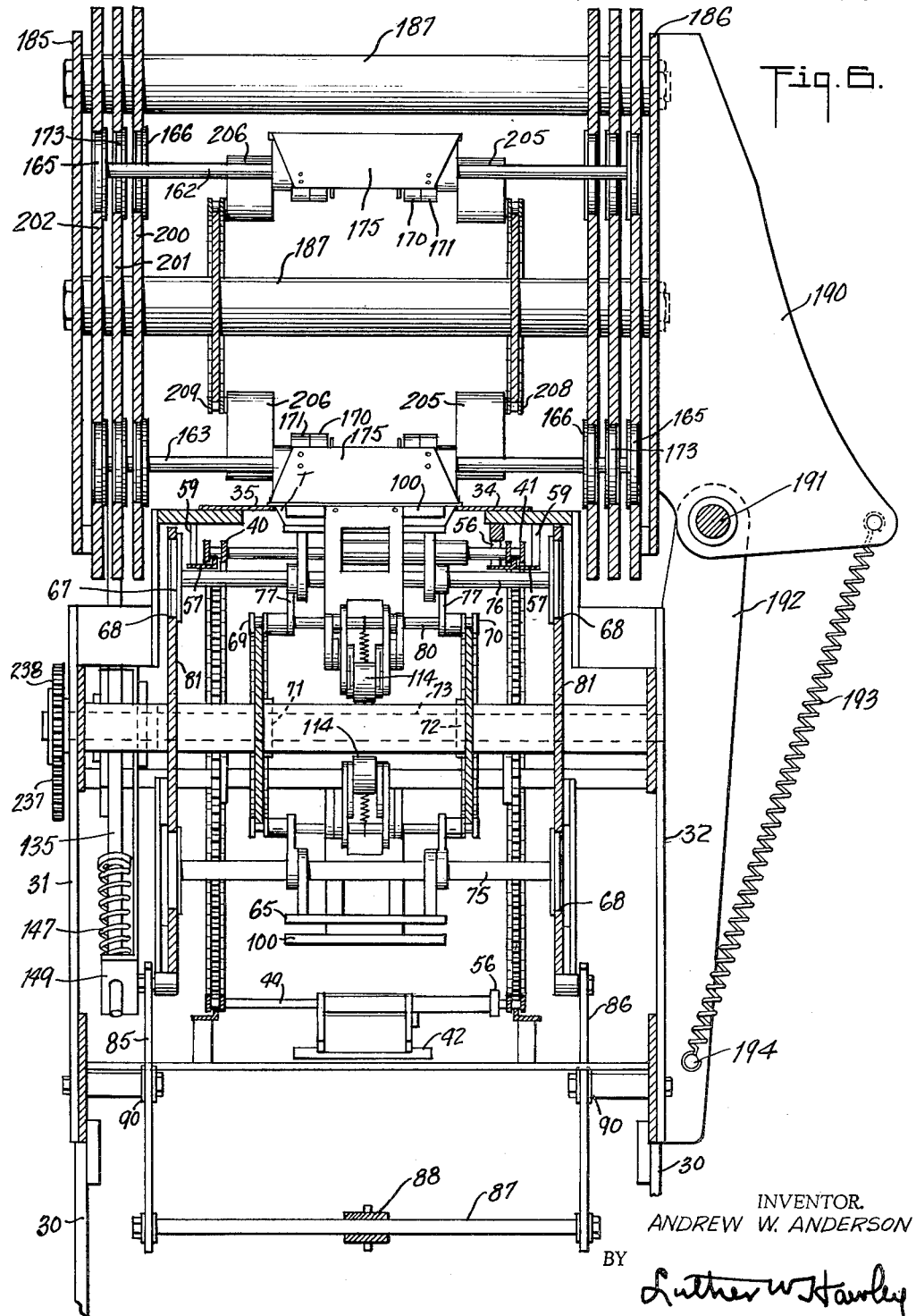

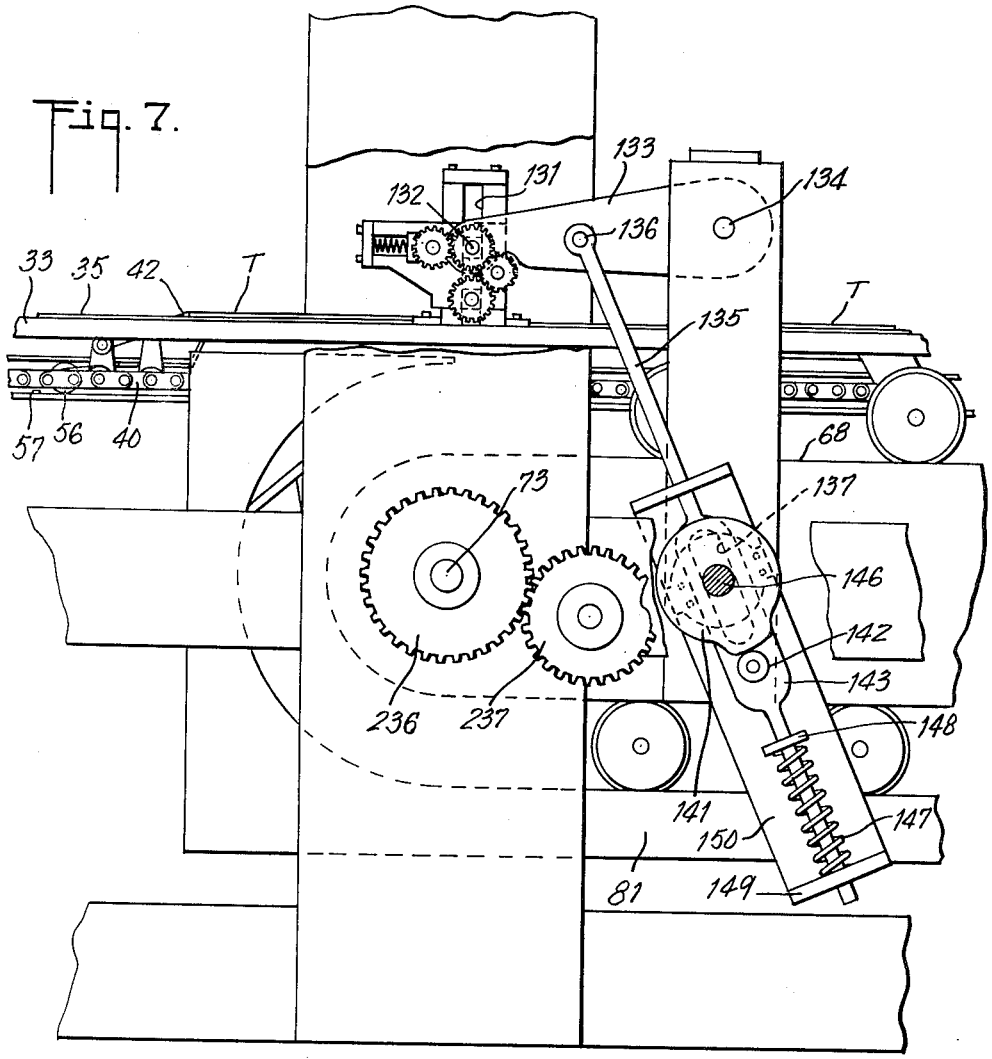

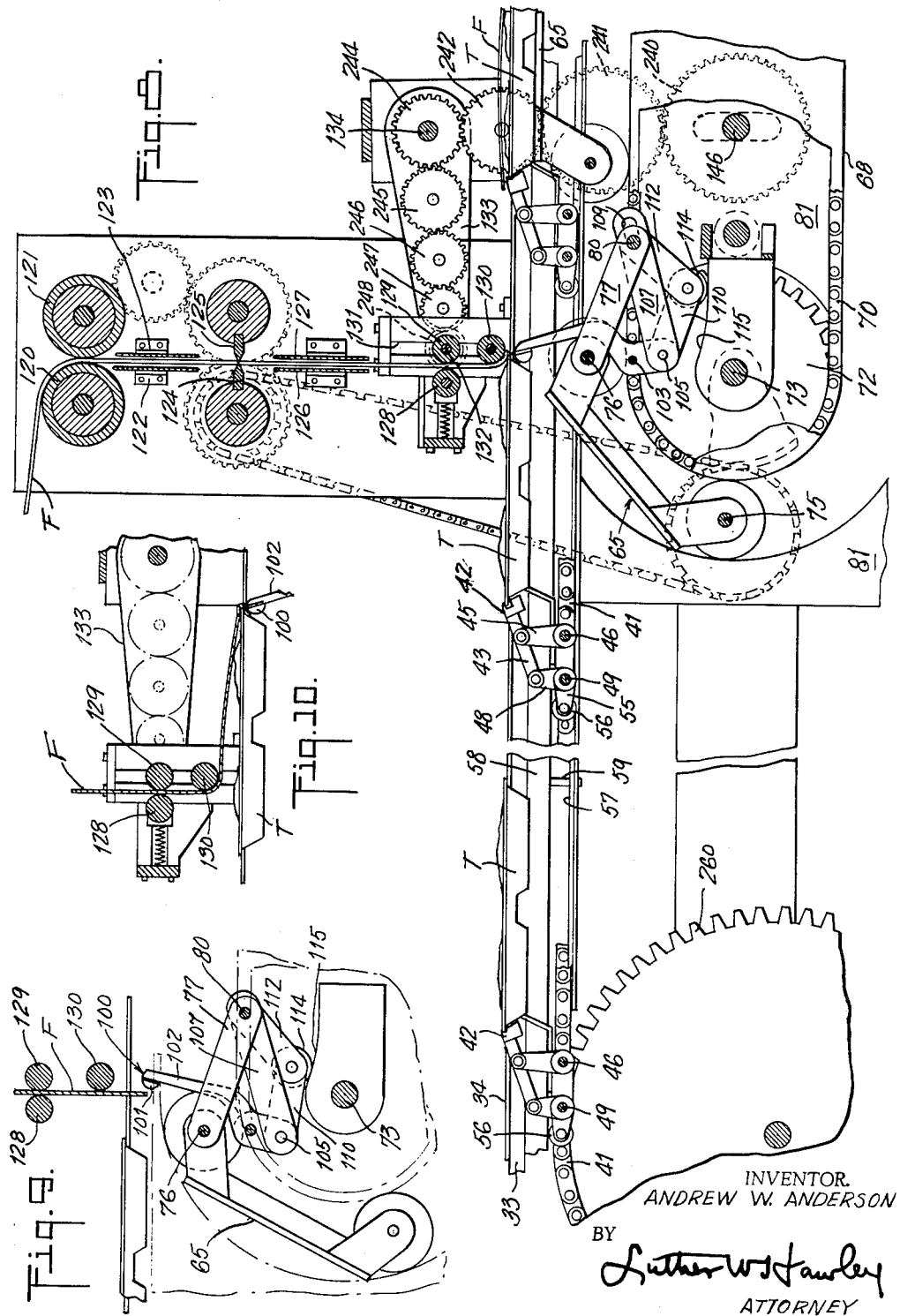

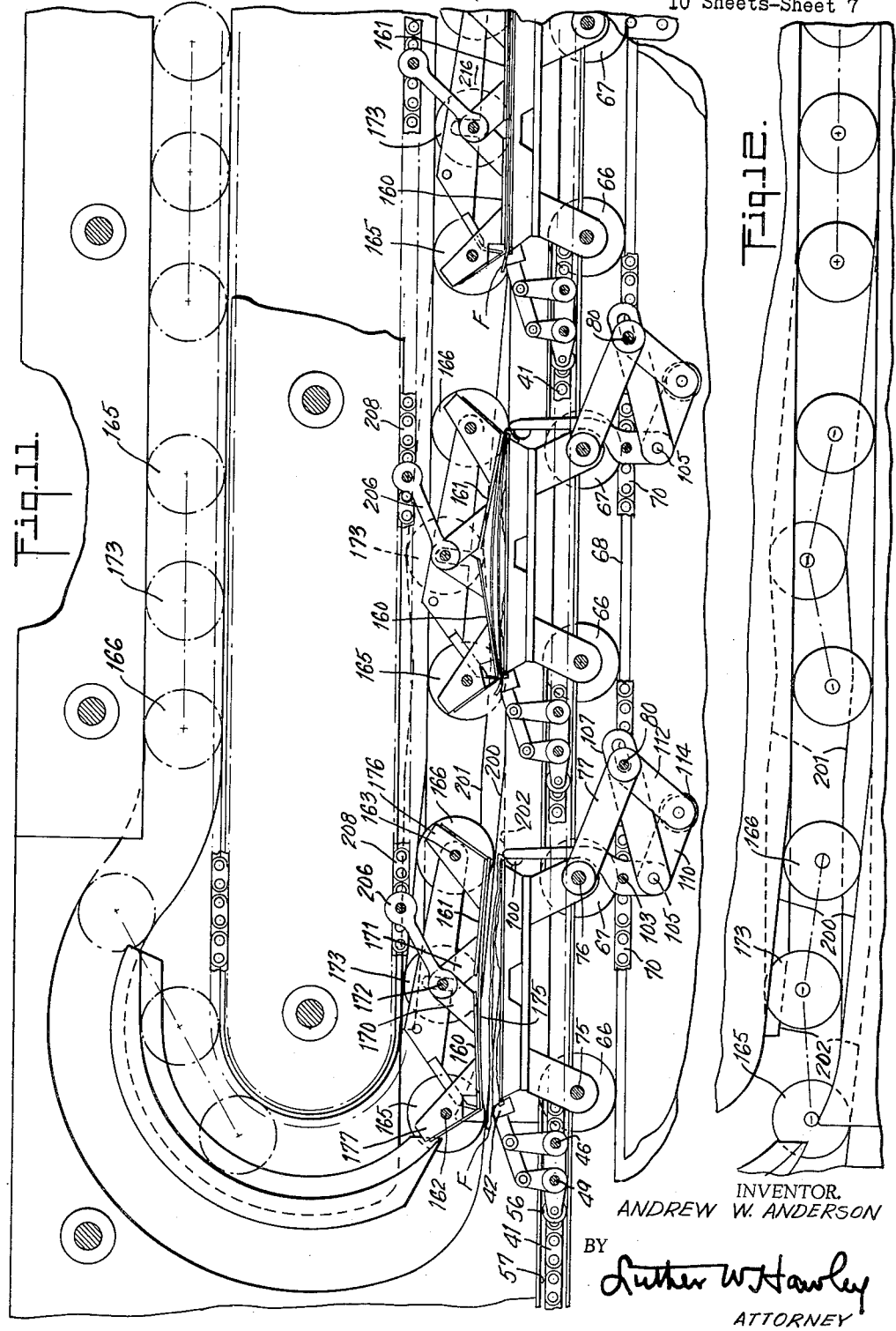

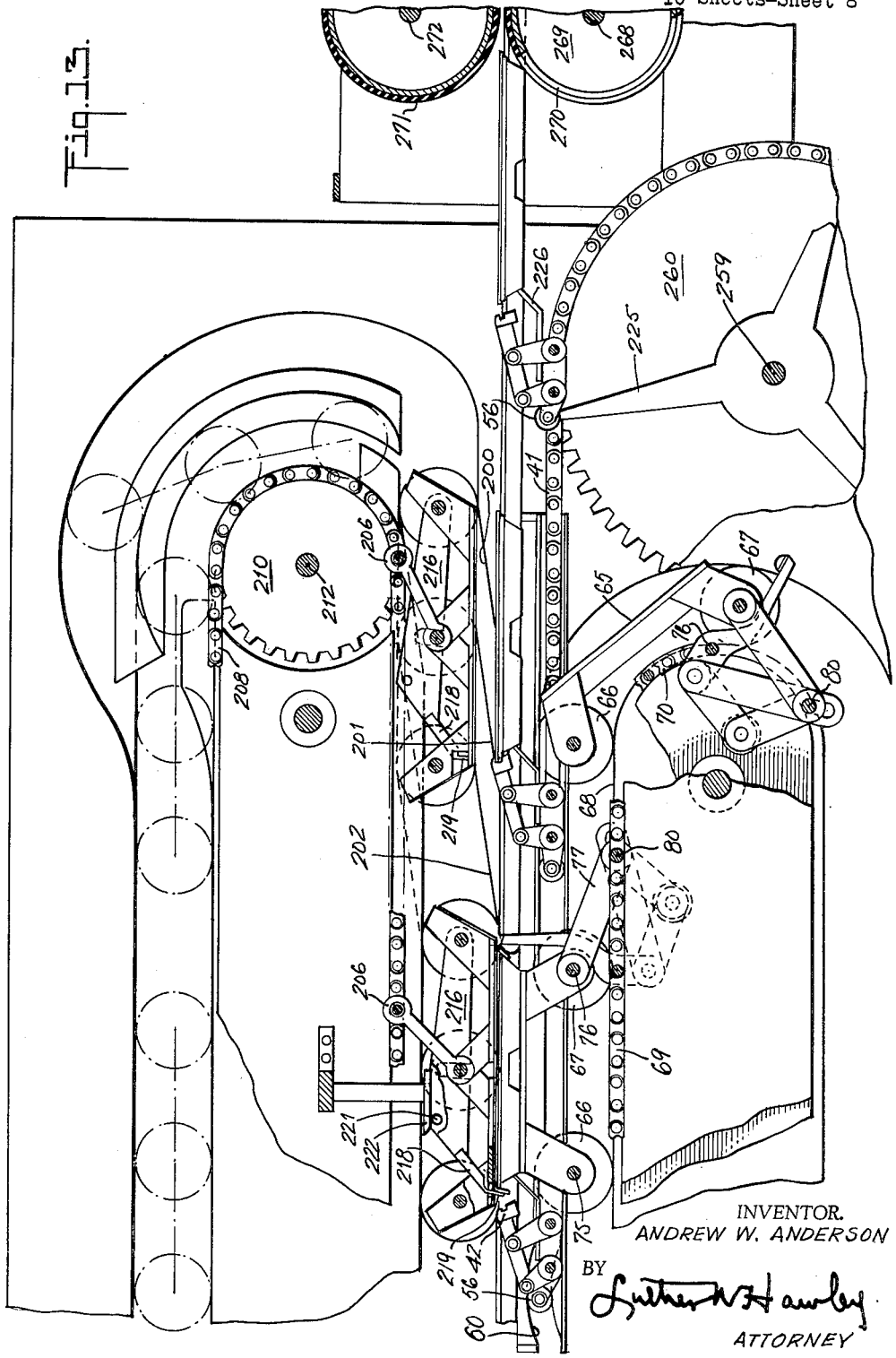

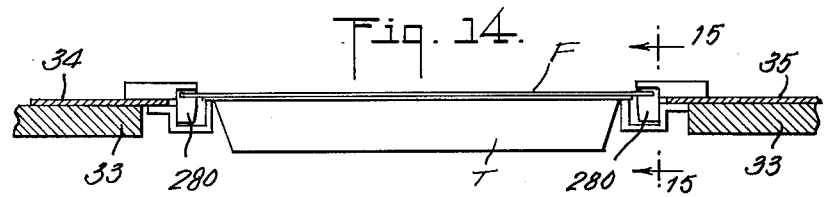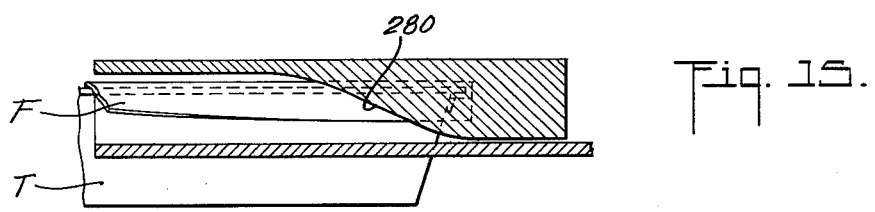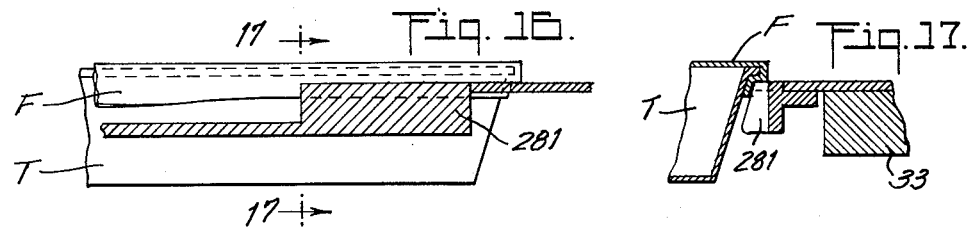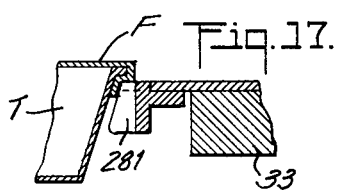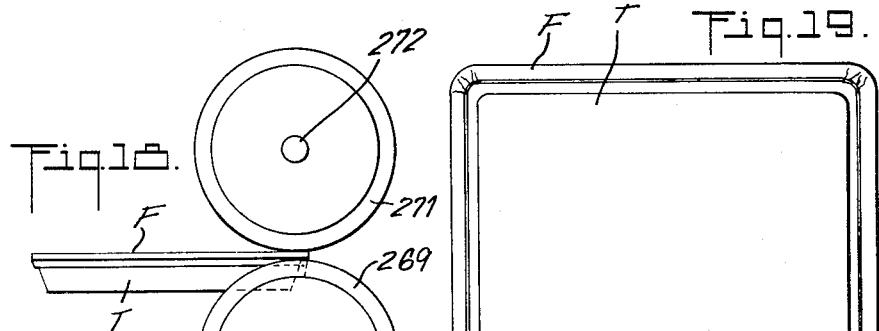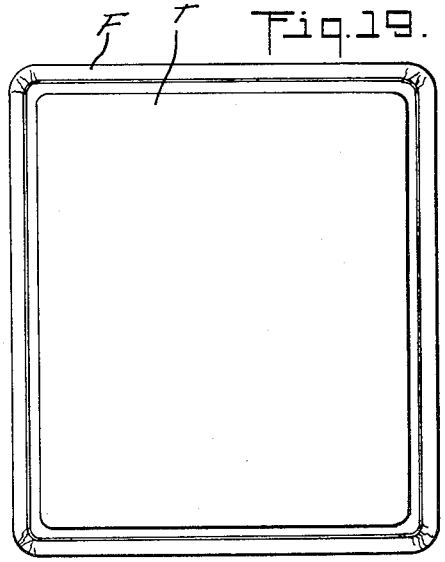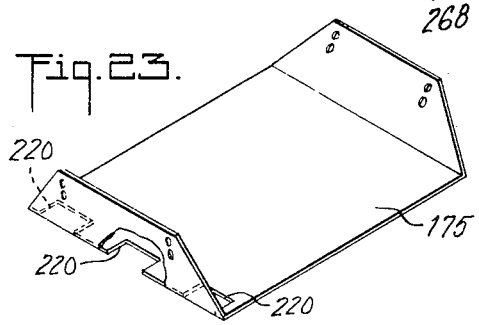

June 30, 1964  A. W. ANDERSON  3,138,906
COMPRESSING MECHANISM FOR FOOD TRAYS
Filed Oct. 5, 1961  10 Sheets-Sheet 10
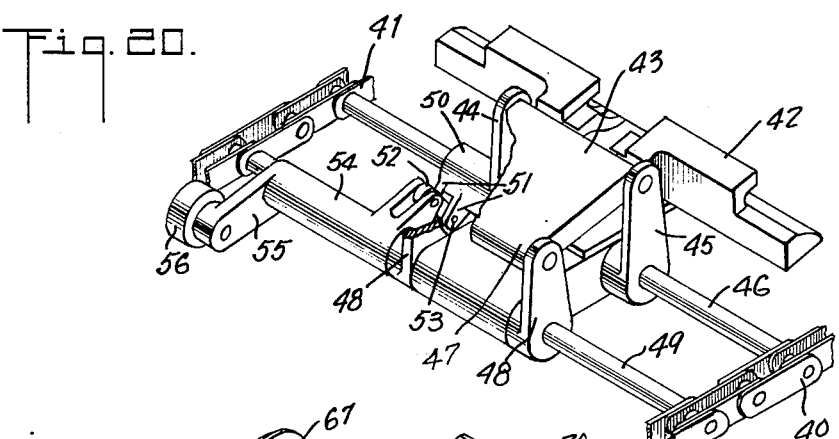
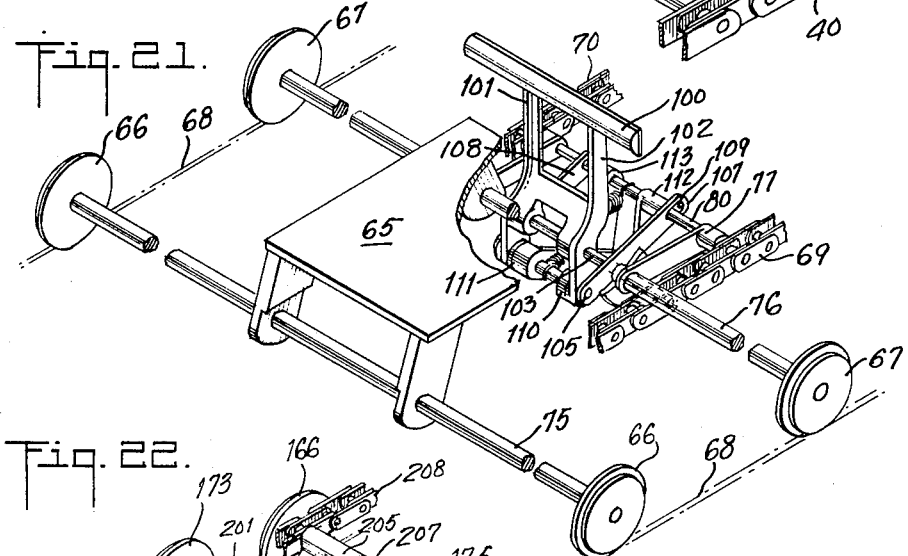
INVENTOR.
ANDREW W. ANDERSON
BY
Luther W. Hawley
ATTORNEY United States Patent Office 3,138,906
Patented June 30, 1964

3,138,906
COMPRESSING MECHANISM FOR FOOD TRAYS
Andrew W. Anderson, West Caldwell, N.J., assignor to Scandia Packaging Machinery Company, North Arlington, N.J., a corporation of New Jersey
Filed Oct. 5, 1961, Ser. No. 143,232
12 Claims. (Cl. 53—124)

This invention relates to compressing mechanism for food trays, such as are commonly known as TV dinners. Such trays, usually made of aluminum, are loaded with hot cooked or baked food and are covered with a sheet of flexible aluminum foil. The trays are then fed to a freezer and in the latest freezers the trays are fed through a freezing tunnel.

In order for the loaded trays to conform to a uniform height and to facilitate boxing of the trays, the overall height of the tray and contents must be kept within limits. This is not difficult when the contents are relatively flat, but with a tray loaded with roast chicken or like food, the contents project upwardly beyond the desired height limit.

In order to overcome the condition above mentioned, this invention has for its salient object to provide simple and practical mechanism for compressing a loaded tray so that the overall height of the tray and contents will be kept within predetermined limits, thereby effecting a material saving of the foil cover.

Another object of the invention is to provide mechanism of the character described, so constructed and arranged that the overall height of the tray and contents can be adjusted within limits.

Another object of the invention is to provide mechanism of the character described, so constructed as to efficiently perform the function and compress loaded food trays for the purpose described.

Further objects of the invention will appear from the following specification taken in connection with the drawings which form a part of this application, and in which FIG. 1 is a front elevation of a machine constructed in accordance with the invention;

FIG. 2 is a top plan view of the mechanism shown in FIG. 1;

FIG. 3 is a rear elevation of the machine shown in FIG. 1;

FIG. 3A is a rear elevation showing the right hand end of the machine shown in FIG. 3;

FIG. 4 is a diagrammatic view illustrating the tilting frame upon which the compressing mechanism is mounted;

FIG. 5 is an end elevation, on an enlarged scale, looking in the direction of the arrow 5 in FIG. 1;

FIG. 6 is a vertical sectional elevation taken substantially on line 6—6 of FIG. 1, looking in the direction of the arrows;

FIG. 7 is an enlarged elevation looking in the direction of the arrow 7 in FIG. 2;

FIG. 8 is an enlarged sectional elevation taken substantially on line 8—8 of FIG. 2, looking in the direction of the arrows;

FIG. 9 is an enlarged detailed view showing the folder for folding the front end of the foil sheet around the end of the tray;

FIG. 10 is an enlarged sectional elevation showing mechanism for guiding and positioning the foil sheet over the loaded tray;

FIG. 11 is an enlarged sectional elevation taken substantially on line 11—11 of FIG. 2, looking in the direction of the arrows;

FIG. 12 is an enlarged elevational view taken substantially on line 12—12 of FIG. 2, looking in the direction of the arrows;

FIG. 13 is an enlarged elevational view, partly in section, of the discharge end of the machine, showing the platform support, upper carriage, etc.;

FIG. 14 is an enlarged transverse sectional elevation taken substantially on line 14—14 of FIG. 2, looking in the direction of the arrows;

FIG. 15 is a sectional elevation taken on line 15—15 of FIG. 14, looking in the direction of the arrows;

FIG. 16 is a sectional elevation showing the side folding means for folding the foil cover around the edges of the tray;

FIG. 17 is a sectional elevation taken substantially on line 17—17 of FIG. 16, looking in the direction of the arrows;

FIG. 18 is an elevational view showing the finishing rollers for positioning the foil around the top and edges of the tray;

FIG. 19 is a plan view of the finished covered tray;

FIG. 20 is a perspective elevation of the tray pushing mechanism;

FIG. 21 is a perspective elevation of the folder for folding the front of the sheet around the front edge of the tray;

FIG. 22 is a perspective elevation of the upper carriage; and

FIG. 23 is a perspective plan view of the bottom sheet or plate of the upper carriage.

The invention, briefly described, comprises means for feeding a tray along a table, means for supporting the tray from below as it is fed along the table, means for feeding a foil sheet into the path of movement of the tray and folding the sheet around the front edge of the tray, means disposed above the path of movement of the tray and movable downwardly against the foil sheet after the foil sheet has been placed over the loaded tray to compress the contents of the tray to predetermined limits, means for folding the rear edge of the foil sheet against the under surface of the rear rim of the tray, and means for folding the sheet against and beneath the side edges of the tray.

Further details of the invention will appear from the following specification.

In order to facilitate the understanding of the invention about to be described, the parts of the machine will be described under suitable headings and the figures in which the parts are illustrated will be indicated as follows:

Tray supporting table and tray feed—FIGS. 2, 8, 11, 13 and 20.
Platform support and feed for platform—FIGS. 1, 2, 5, 6, 8, 11 and 13.
Folder for folding and holding the front edge of the foil sheet against and around the front edge of the tray—FIGS. 8, 9, 11, 13 and 21.
Feeding, positioning and cutting mechanism for foil sheet—FIGS. 7, 8 and 9.
Carriage compressing mechanism—FIGS. 6, 11, 12, 13 and 22.
Folder for folding the rear edge of the sheet—FIGS. 13, 20 and 22.
Side folders—FIGS. 13 to 18 inclusive.

The machine on which the various operating parts are mounted comprises a plurality of supporting posts or pedestals 30, to which are bolted side frames 31 and 32, to the upper ends of which are secured a supporting table 33 comprising ledges 34 and 35 which are spaced apart, as shown at 36, to receive the trays T, the longitudinal edges 37 and 38 of the trays resting on the ledges 34 and 35.

*Tray Supporting Table and Tray Feed*

This mechanism, as above stated, is particularly shown in FIGS. 2, 8, 11, 13 and 20.

The trays are placed on the table 33 or on the ledges 34 and 35 in any suitable manner and are thereafter fed along the table by pushers 42 carried by a pair of conveyor chains 40 and 41. Each pusher is mounted on the front end of a hinged plate 43 which is pivotally connected to a pair of arms 44 and 45 carried by a rod 46, which in turn is carried by the chains 40 and 41. The rear end of the plate 43, as shown at 47, is mounted on arms 48 secured to a rod 49 also connected to the chains 40 and 41. The arm 44 is carried by a hub 50 mounted on the rod 46 and the hub 50 has extending rearwardly therefrom a pair of lugs 51 between which is connected a link 52 which is pivoted at 53 to a sleeve 54 mounted on the rod 49. The sleeve 54 has extending rearwardly therefrom an arm 55 which carries a roller 56 mounted in a cam track 57. The cam track or support 57 for the roller 56 also acts as a support for the chains 40 and 41 and the cam track is supported from plates 58 by vertical supports 59.

The guide or cam track for the roller 56 is substantially horizontal during the major portion of the travel of the pushers, but after the compressing operation has been completed and the rear end of the foil sheet is to be folded over the rear end of the tray the pusher is momentarily released in the manner shown in FIG. 13 by the raised portion 60 of the cam track 57 which causes the roller 56 to be elevated, thus retracting the front end of the pusher. Thereafter, the pusher moves back to its engaging position, as shown at the delivery end of the machine illustrated in FIG. 13. The means for folding the rear end of the sheet over the rear end of the tray will be described later.

*Platform Support and Feed for the Platform*

This mechanism, as above stated, is illustrated particularly in FIGS. 1, 2, 5, 6, 8, 11 and 13.

In order to firmly support the trays from beneath as they are fed along the table by the pushers and during the compressing operation, a plurality of platforms 65 are mounted on rollers 66 and 67 which are supported on tracks 68 and are fed through the machine by chains 69 and 70 mounted on sprockets 71 and 72 carried by a shaft 73. The rollers 66 and 67 are mounted on rods 75 and 76 and the rod 76 is connected by links 77 to a rod 80 which is carried by the chains 69 and 70.

In order to adjust the platform supporting track 68 to provide for different depths of trays, adjusting means is provided, this being shown particularly in FIGS. 1 and 6. Plates 81 in which tracks 68 are formed are pivotally connected to levers 85 and 86, the lower ends of the levers being connected to rods 87 which are connected to a bar 88. One end of the bar 88 has connected thereto a lever or arm 89, which is pivoted at 90 to the machine and has its upper end provided with a threaded opening which receives a screw 91 threaded into a fixed part of the machine, as shown at 92. The outer end of the screw has secured thereto a handle 93. As the screw is turned, the bar 88 is moved longitudinally and swings the arms 85 and 86, thus raising or lowering the plates 81 and the tracks 68 which are formed therein.

*Folder and Holder for the Front Edge of the Foil*

As above stated, this mechanism is shown particularly in FIGS. 8, 9, 11, 13 and 21.

This mechanism is mounted on the supporting means for the platforms 65. As shown in FIGS. 8 and 21, a bar 100 is mounted on the upper end of arms 101 and 102 which are pivoted on a rod 103 carried by the chains 69 and 70 for the platforms 65. The lower ends of the arms 101 and 102 are pivoted at 105 to links 107 and 108, the other ends of which are slotted, as shown at 109, and receive the cross rods 80 carried by the chains 69 and 70.

The lower ends of the links 107 and 108 are also connected at 105 to links 110 and 111 connected to the lower ends of links 112 and 113, which in turn are connected at their upper ends to the cross bar 80. The ends of the links 110 and 111 have mounted thereon a roller 114 which is mounted in a cam track 115.

In FIG. 9 the foil sheet F has been fed downwardly into the path of movement of the trays and is severed in a manner hereinafter described, whereupon the lower end is engaged by the folding bar 100 in the manner shown in FIG. 8. It will be noted that in these figures the roller 114 has moved downwardly from the upwardly extending protuberance on the cam 115. The lower end of the foil is then held by the bar 100 as the foil is positioned across the top of the loaded tray in the manner shown in FIG. 10. Thereafter, the compressing mechanism is brought into operation and after the compressing operation has been completed the rear end of the foil will be folded around the rear edge of the tray, as shown in FIG. 13. The platforms 65 then pass around their guide track, as shown in FIG. 13, and the tray is released.

*Feeding, Positioning and Cutting Mechanism for Foil Sheet*

This mechanism is particularly illustrated in FIGS. 7, 8 and 9.

As shown in FIG. 8, a web of foil F is fed downwardly from a suitable source of supply between feed rollers 120 and 121, between guide plates 122 and 123, and between cutters 124 and 125. The cutters cut the web into sheets which are thereafter fed downwardly between plates 126 and 127 and between feed rollers 128 and 129. The sheet is thus fed into the path of movement of the trays and is positioned and guided over the top of the trays by a roller 130.

In order to prevent the sheet from being punctured or broken by the contents of the tray prior to the compression of the contents, means shown in FIG. 7 is provided to lift the feed rollers 128 and 129 and the guide roller 130 as the tray passes beneath the feed rollers and the foil sheet is guided across the top of the tray and contents. In order to accomplish this the feed rollers 128 and 129 and the roller 130 are mounted in a block which is slidably vertical in a guideway 131. The shaft 132 of the feed roller 129 is mounted on an arm 133 pivoted at 134 on a fixed pivot shaft.

A pitman 135 is pivoted at 136 to the arm 133 and has a slot 137 in the lower end thereof. A shaft 146 extends through the slot 137 and has mounted thereon a cam 141 which engages a roller 142 mounted on an extension 143 of the pitman 135. The lower end of the pitman below the roller 142 is surrounded by a spring 147 which is positioned between a collar 148 on the pitman and a flange 149 on a plate or bar 150 carried by a block mounted on the shaft 146. It will be obvious that as the cam 141 rotates the pitman will be reciprocated and will raise and lower the arm 133 and the roller 130 and feed rollers 128 and 129. It will be understood that this movement is synchronized with the movement of the trays through the machine and that the rollers 128 and 129 and 130 will be raised as the tray passes beneath the sheet feeding mechanism and the foil sheet is placed over the contents of the tray.

*Carriage Compressing Mechanism*

This mechanism, as above stated, is shown in FIGS. 6, 11, 12, 13 and 22.

After the trays have been placed on the supporting ledges and have been fed into the machine, the platforms 65 move beneath the trays to support the trays from below. Thereafter, a carriage moves into position above the platform and above the loaded tray after the foil sheet F has been placed above the tray in the manner shown in FIG. 10. This carriage, as shown in FIGS. 11, 13 and 22, comprises a pair of hinged plates or wings 160 and 161 which are pivotally mounted on spindles 162 and 163, on the ends of which are mounted rollers 165 and 166.

The inner ends of each of the hinged plates or wings 160 and 161 are provided respectively with upwardly extending brackets 170 and 171 and a spindle 172 extends through openings in these brackets and has secured to the outer ends thereof rollers 173.

A flexible, resilient, metal sheet 175 is secured to brackets 176 at one end of the plate 161 and to brackets 177 at one end of the plate 160. The plates 160 and 161 are preferably perforated, as shown at 180, to facilitate cleaning.

The carriage and compressing mechanism are mounted upon a separate frame member comprising side plates 185 and 186 which are secured together by a series of transverse posts 187. The side plate 186 has secured thereto and extending outwardly therefrom brackets 190 which are pivoted on a shaft 191 which extends longitudinally of the machine. The shaft 191 is supported in brackets 192 secured to the base of the machine. Counterbalancing springs 193 connect the brackets 190 to pins 194 near the bottom of the brackets 192.

Between the side plates 185 and 186 are mounted three sets of tracks 200, 201 and 202, on which are mounted respectively the three sets of rollers 166, 173 and 165. The movement of the plates or wings 160 and 161 is controlled by the central track 201 which guides the rollers 173 mounted on the spindle 172.

The carriages are propelled around the tracks by means of plates or bars 205 and 206 which are pivoted at one end to the spindle 172 and at their other ends to pins 207 which are connected to chains 208 and 209 which are driven by sprockets 210 and 211 mounted on a shaft 212 (see FIG. 13).

As the carriages are pulled through the machine by the plates or bars 205 and 206, the tracks 200, 201 and 202 will guide the rollers 166, 173 and 165 in the paths shown particularly in FIGS. 11 and 12. When the left hand carriage is moved above the platforms 65 and the tray supported thereon and over the foil sheet which has been placed over the contents of the tray and secured to the front edge of the tray, as shown in FIG. 10, the plates 160 and 161 will be slightly elevated, as shown at the left in FIG. 11. As the carriage moves along the tracks, the pusher 42 will be disposed beneath the trailing end of the foil cover sheet, as shown at the center of FIG. 11, and the plates will be swung upwardly and will thereafter be depressed, as shown at the right in FIG. 11, to compress the contents of the tray so that the tray and contents will be held within a predetermined vertical depth. The positions of the rollers 165, 173 and 166 in the three positions of movement of the carriage are indicated in FIG. 12. During this time it will be understood that the front edge of the foil will be held around the front rim of the tray by the plate 100.

*Folder for Folding the Rear Edge of the Sheet*

This mechanism, as above stated, is shown in FIGS. 13, 20 and 22.

After the carriage has reached the right hand position shown in FIG. 11, or, in other words, the position of maximum compression, the rear edge of the foil cover is pushed downwardly in the manner shown particularly in FIGS. 13 and 22. A pair of plates 215 and 216 are pivoted on the spindle 163 and are slotted, as shown at 217, to clear the central spindle 172. The rear ends of the plates have mounted thereon a transversely extending plate 218 having downwardly extending spaced lips 219. The flexible sheet or plate 175 on the bottom of the carriage has openings 220 to permit passage of the lips 219.

The plates 215 and 216 are connected by a spindle or rod 221 which is engaged by a fixed cam member 222, as shown in FIG. 13, and this member depresses the plates 215 and 216 and the lips 219 carried thereby and the lips engage the rearwardly projecting edge of the foil sheet F in the manner shown at the left in FIG. 13. During this movement, the pusher 42 has been moved out of engagement with the rear edge of the tray by means of the cam 60 which engages and elevates the roller 56. Thereafter, the pusher again moves into operative position and engages the rear edge of the foil sheet F in the manner shown at the center of FIG. 13. At this point the carriage has moved upwardly away from engagement with the foil cover of the tray and the platform 65 has moved downwardly away from the bottom of the tray.

The covered tray continues its movement along the ledges 34 and 35 and when the pusher reaches the position shown at the right in FIG. 13 radial arms 225 engage the roller 56 and release the roller from engagement with the rear edge of the foil sheet and the rear edge of the tray. In order to prevent the tray from moving rearwardly when the pusher is released, a finger 226 engages the rear end of the tray. The finger is secured to each of the pushers.

*Driving Connections*

As shown in FIG. 1, a transverse shaft 230 is driven by a chain 231 from a motor or other suitable source of power. The shaft 230 extends across the machine, as shown in FIG. 3, and drives a shaft 232 by means of a chain 233. The shaft 232 has mounted thereon a gear 234 which drives a gear 235 mounted on the shaft 73, which carries the sprockets 71 and 72 for the chains 69 and 70. The shaft 73 extends across the frame and has mounted thereon a gear 236 which, through an idler 237, drives a gear 238 on the shaft 146 (see FIG. 1). The shaft 146, through gears 240, 241 and 242, drives a gear 244 on shaft 134. The shaft 134, through gears 245, 246 and 247, drives a gear 248 on the shaft 132 (see FIG. 8).

The shaft 146 also drives the pitman 135, as shown in FIG. 7 and as above described.

As shown in FIG. 3, the shaft 146 is connected by a bevel gear connection to drive a shaft 250 which is connected by a chain 251 to drive shaft 191, which acts as a hinge for the top frame.

As shown in FIGS. 3 and 5, the shaft 191 is connected by a gear drive 252, 253 and 254 to drive a shaft 255. Shaft 255 is connected by a bevel gear connection to drive the shaft 212 on which are mounted sprockets 210 and 211 for driving the chains 208 and 209 for the carriage.

As shown also in FIG. 5, the shaft 191 is connected by a chain 256 to a sprocket 257 mounted on a shaft 258. Shaft 258 is connected through a bevel gear connection to drive a shaft 259 on which are mounted sprockets 260 for driving the chains 40 and 41 on which is mounted the pusher 42.

In FIGS. 1 and 5 it will be noted that the shaft 259 extends across the machine and through a sprocket 265 drives a chain 266 which through a sprocket 267 drives a shaft 268 on which is mounted a roller 269 having a cut out portion 270.

After the tray has been discharged from the compressing mechanism to the position shown in FIG. 13, the tray passes between the roller 269 and a roller 271 mounted on a shaft 272 which is driven from the shaft 268 through a train of gears 273, 274 and 275. When the tray passes between the rollers 269 and 271, the folded edges at the sides and front and rear of the tray are firmly pressed against the under side of the tray rim to the form shown in FIG. 19.

*Side Folders*

This mechanism, as stated above, is shown in FIGS. 13 to 18 inclusive.

Prior to passing between the rollers 269 and 271, the side edges of the foil sheet F are folded under the side rims of the tray by engagement with inclined folding surfaces 280 and 281 in the usual well known manner, as illustrated in FIGS. 14 to 17 inclusive. Since inclined folding edges are old and common and no novelty is claimed therein, further description is not deemed necessary.

*Summary of Operation*

From the foregoing specification it will be seen that loaded trays are first fed into the machine by the pushers. Thereafter, the supporting platforms move upwardly beneath the loaded trays, a sheet of foil is fed downwardly into the path of the trays, is severed and placed over the top of the loaded tray. The carriage then moves downwardly above the covered loaded tray, which is at this time supported by the platform, and the wings or plates are controlled by the cam tracks to cause the wings to depress the flexible under plate of the carriage, thus compressing the tray contents to a predetermined limit of over all height. The compressing operation is illustrated in FIGS. 11 and 12.

After the contents of the tray has been compressed the platforms move out of engagement with the bottom of the tray, as shown in FIG. 13, and the carriages move upwardly away from the top of the covered tray and the trays are released from the pushers and are moved between the finishing rollers.

As has been explained above, the carriages and cam tracks which control the carriages are mounted in a hinged frame which can be swung upwardly in the manner shown in FIG. 4 to enable the operator to gain access to the parts carried thereby.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. A machine for compressing the contents of a loaded food tray having a flexible cover comprising means for supporting and feeding loaded trays, means disposed above said tray supporting means for compressing the tray contents to predetermined limits, said compressing means comprising a carriage movable in synchronism with the tray supporting means and having a bottom movable downwardly in contact with the tray cover, and means for depressing the carriage bottom during its travel.

2. A machine for compressing the contents of a loaded food tray having a flexible cover comprising means for supporting and feeding loaded trays, means disposed above said tray supporting means for compressing the tray contents to predetermined limits, said compressing means comprising a carriage movable in synchronism with the tray supporting means and having a bottom movable downwardly in contact with the tray cover, and cam controlled means for depressing the carriage bottom during its travel.

3. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, and means operable during the travel of the carriages for depressing the under portions thereof against the contents of the trays.

4. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having movable bottom portions, and means operable during the travel of the carriages for depressing the under portions thereof against the contents of the trays.

5. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having movable plates above and engaging said bottoms, and means for moving the plates to depress the bottoms during the travel of the tray supports and carriages through the machine.

6. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having pivoted plates above and engaging said bottoms, and means for moving the plates to depress the bottoms during the travel of the tray supports and carriages through the machine.

7. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having movable plates above and engaging said bottoms, and means including fixed cams for moving the plates to depress the bottoms during the travel of the tray supports and carriages through the machine.

8. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having movable plates above and engaging said bottoms, and successively acting means for moving the plates to depress the bottoms during the travel of the tray supports and carriages through the machine.

9. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having movable plates above and engaging said bottoms, and successively acting cam means for moving the plates to depress the bottoms during the travel of the tray supports and carriages through the machine.

10. A machine for compressing the contents of loaded food trays comprising flexible means for covering the trays, endless conveyors having means for supporting the trays, a second set of conveyors above said first named conveyors and movable in synchronism therewith, carriages carried by said second set of conveyors and movable to positions above and registering with the tray supporting means, said carriages having flexible bottoms and having movable plates above and engaging said bottoms, and successively acting, fixed cam means for moving the plates to depress the bottoms during the travel of the tray supports and carriages through the machine.

11. A machine for compressing the contents of loaded food trays comprising endless conveyor means for supporting and feeding loaded food trays, means for feeding a sheet of flexible material into the path of movement of each tray, means for folding and holding the flexible sheet around the front edge of the loaded tray, separate means movable into contact with the tray cover of each tray for compressing the contents of said tray during its movement, means for folding the sheet under the lateral edges of the tray, and means for folding the rear edge of the sheet under the rear edge of the tray after the contents of the tray has been compressed.

12. A machine of the character described comprising means for feeding loaded food trays, means for feeding a flexible cover sheet in the path of movement of the trays, means for folding the bottom edge of the sheet under the front edge of the tray, separate means for compressing the contents of each of the trays, means engageable with the rear edge of the flexible cover for folding the said edge under the rear edge of the tray, a pair of rollers in the path of movement of the tray, and means for feeding the trays between the rollers, the lower roller being recessed to receive the trays and the upper roller having portions engageable with the outer edge portions of the loaded tray cover.

References Cited in the file of this patent

UNITED STATES PATENTS

| | | |
|---|---|---|
| 1,363,824 | Tait | Dec. 28, 1920 |
| 2,276,541 | Howard | Mar. 17, 1942 |
| 2,702,971 | Brandenborger | Mar. 1, 1955 |
| 2,896,837 | Brock | July 28, 1959 |
| 2,972,215 | Danielzig | Feb. 21, 1961 |